United States Patent [19]

Yoshioka et al.

[11] Patent Number: 4,826,207

[45] Date of Patent: May 2, 1989

[54] COMPOUND SUSPENSION SYSTEM

[75] Inventors: Hiroshi Yoshioka; Tsunehiko Fukatsu; Nobuharu Kuriki; Yasushi Aoki; Takashi Takeuchi; Tsutomu Naitou; Nobuo Mori, all of Saitama, Japan

[73] Assignees: Honda Giken Kogyo Kabushiki Kaisha; Kabushiki Kaisha Showa Seisakusho, both of Tokyo, Japan

[21] Appl. No.: 144,052

[22] Filed: Jan. 15, 1988

[30] Foreign Application Priority Data

Jan. 16, 1987 [JP] Japan .................. 62-007720

[51] Int. Cl.$^4$ .............. F16F 9/44; B60G 17/08
[52] U.S. Cl. ................... 280/714; 188/319
[58] Field of Search ............. 280/714, 707; 188/299, 188/319; 137/625.3, 625.32

[56] References Cited

U.S. PATENT DOCUMENTS

| 3,040,841 | 6/1962 | Schultze | 188/299 |
| 4,627,637 | 12/1986 | Toshimitsu | 280/714 |
| 4,765,446 | 8/1988 | Murata et al. | 188/319 |

FOREIGN PATENT DOCUMENTS 58-124312 8/1983 Japan .

Primary Examiner—Charles A. Marmor
Assistant Examiner—Karin Tyson
Attorney, Agent, or Firm—Nixon & Vanderhye

[57] ABSTRACT

For better handling and improved riding comfort of a vehicle, there is provided a compound suspension system comprising a plurality of hydraulic shock absorbers each having a front chamber and a back chamber defined in front of and behind a piston member, respectively, received in a cylinder member, and a valve structure provided in each of the shock absorbers for selectively communicating the chambers to a conduit which is common to at least one other shock absorber, wherein: the valve structure comprises a valve element provided with a first part for varying a degree of communication between the front chamber and the common conduit and a second part for varying a degree of communication between the front chamber and the back chamber. The valve element is provided with two sets of openings which are spaced longitudinally from each other so as to cooperate with different ports provided in the piston rod as the valve element is turned about its longitudinal center by means of a control rod which extends longitudinally through a central bore of the piston rod.

9 Claims, 5 Drawing Sheets

COMPOUND SUSPENSION SYSTEM

TECHNICAL FIELD

The present invention relates to a compound suspension system in which the oil chambers of the shock absorbers for a plurality of vehicle suspension devices for different wheels are mutually communicated for an interrelated control of the suspension devices.

BACKGROUND OF THE INVENTION

To the end of improving the handling and the riding comfort of a vehicle, it has been proposed to interconnect the oil chambers of the shock absorbers of the suspension devices for different wheels of the vehicle. According to this technology, when one of the wheels of the vehicle rides over a bump in the road surface (compression) the working fluid in the oil chamber of the shock absorber connected to this wheel is conveyed to the oil chambers of the shock absorbers connected to the rest of the wheels of the vehicle, and when one of the wheels of the vehicle drops into a depression in the road surface (extension) the working fluid in the oil chambers of the shock absorbers connected to the other wheels is conveyed to the oil chamber of the shock absorber connected to this wheel, with the result that the horizontal attitude of the vehicle is maintained in spite of the bumps and depressions in the road surface and the riding comfort of the vehicle is improved.

However, when the vehicle accelerates, decelerates or makes a turn, simply interconnecting the oil chambers of the shock absorbers of the different wheels of the vehicle would amplify the pitching and rolling motions of the vehicle. To eliminate this problem, Japanese patent laid-open publication No. 58-124312 proposes the use of throttle valves in the conduits which interconnect the oil chambers of the shock absorbers of different wheels, for controlling and shutting off the communication between them. This proposal is disadvantageous in that the necessary conduit system involves high assembling cost and the spaces for mounting the throttle valves may not be readily available in an already cramped modern automobiles.

It is also preferable if the damping factors of the shock absorbers can be adjusted according to the desire of the driver and the road condition, and various shock absorbers with adjustable damping coefficients have indeed been proposed. It will be particularly advantageous if shock absorbers with variable damping coefficients can be combined with a compound suspension system. However, a compound suspension system combining shock absorbers with variable damping coefficients have hitherto not been made available presumably due to the increased complexity of the internal structure of the shock absorbers and the conduit system and the increased assembly cost resulting from this complexity.

BRIEF SUMMARY OF THE INVENTION

In view of such problems of the prior art, a primary object of the present invention is to provide a compound suspension system which advantageously combines a mechanism for adjusting the damping coefficient of each of the shock absorbers and a mechanism for adjusting the degree of communication between the oil chambers of the shock absorbers for different wheels.

A second object of the present invention is to provide a compound suspension system which combines the advantages of an adjustable damping coefficient and an adjustable communication between the oil chambers of different shock absorbers without unduly increasing the complexity and the manufacturing cost of the system.

These and other objects of the present invention will be accomplished by providing a compound suspension system comprising a plurality of hydraulic shock absorbers each having a front chamber and a back chamber defined in front of and behind a piston means, respectively, received in a cylinder member, and a valve means provided in each of the shock absorbers for selectively communicating the chambers to a conduit which is common to at least one other shock absorber, wherein: the valve means is provided with a first part for varying a degree of communication between the front chamber and the common conduit and a second part for varying a degree of communication between the front chamber and the back chamber. Preferably, the first part and the second part of the valve means comprise a common valve element which is adapted to be actuated by a common actuating means. Thus, the single valve means provided in the shock absorber itself serves the purposes of adjusting the damping coefficient of each of the shock absorbers and adjusting the degree of communication between the oil chambers of the shock absorbers for different wheels at the same time.

According to a certain preferred embodiment of the present invention, the piston means is provided with a pair of damping passages communicating the front chamber and the back chamber with each other, each of the damping passages being provided with a one-way valve permitting fluid flow of a different direction from the one-way valve provided in the other damping passage; and is further provided with a pair of compound passages which communicate the common conduit to the front chamber and the back chamber, respectively, each of the compound passages being provided with a one-way valve which permits fluid flow directed from the common conduit to the corresponding. This structure permits these oil passages to be provided in the piston means and eliminates the need to attach external elements to the shock absorbers for providing a compound suspension system.

An advantageous embodiment of the valve mean is provided with a cylindrical and substantially hollow valve element which is received in a free end of a hollow piston rod connected to the piston means, in a rotatable manner about its longitudinal center line, the valve element being provided with openings which cooperate with ports provided in the free end of the hollow piston rod. Adjustment of the degrees of communication between the back chamber and the front chamber as well as between the front chamber and the common conduit can be accomplished by a structure in which the valve element is provided with two sets of openings, the two sets of opening being spaced from each other along a longitudinal direction of the valve element, each of the sets of openings presenting different opening areas to the corresponding port depending on angular position of the valve element relative to the piston rod.

If this valve element defines a longitudinal passage which forms at least a part of the compound passages communicating the common conduit with the front chamber and the longitudinal passage is provided with the one-way valve which permits fluid flow from the common conduit to the front chamber, an advantageous saving in component parts and space can be achieved.

According to a certain embodiment of the present invention, the piston means is provided with a piston member which defines two longitudinal passages which form at least a part of the damping passages communicating the front chamber and the back chamber with each other, the one-way valves being provided at respective outlet ends of the longitudinal passages, the longitudinal passage which is directly communicated with the front chamber being directly communicated with the port which cooperates with the opening of the valve element for communication between the front chamber and the common conduit while the longitudinal passage which is directly communicated with the back chamber is directly communicated with the port which cooperates with the opening of the valve element for communication between the front chamber and the back chamber.

An advantageous actuation of the valve element can be accomplished if the valve element is provided with an engagement surface in a middle part thereof for engagement with a control rod which extends longitudinally in a central bore of the hollow piston rod, a free end of the control rod being received in a hole provided in a fore most end portion of the control rod for stable support of the fore most end of the control rod.

BRIEF DESCRIPTION OF THE DRAWINGS

The above-mentioned and other features and objects of this invention and the manner of obtaining them will become more apparent and the invention itself will be better understood by reference to the following description of an embodiment of this invention taken in conjunction with the accompanying drawings, in which.

DETAILED DESCRIPTION OF THE PREFERRED EMBODIMENT

Figure 1:
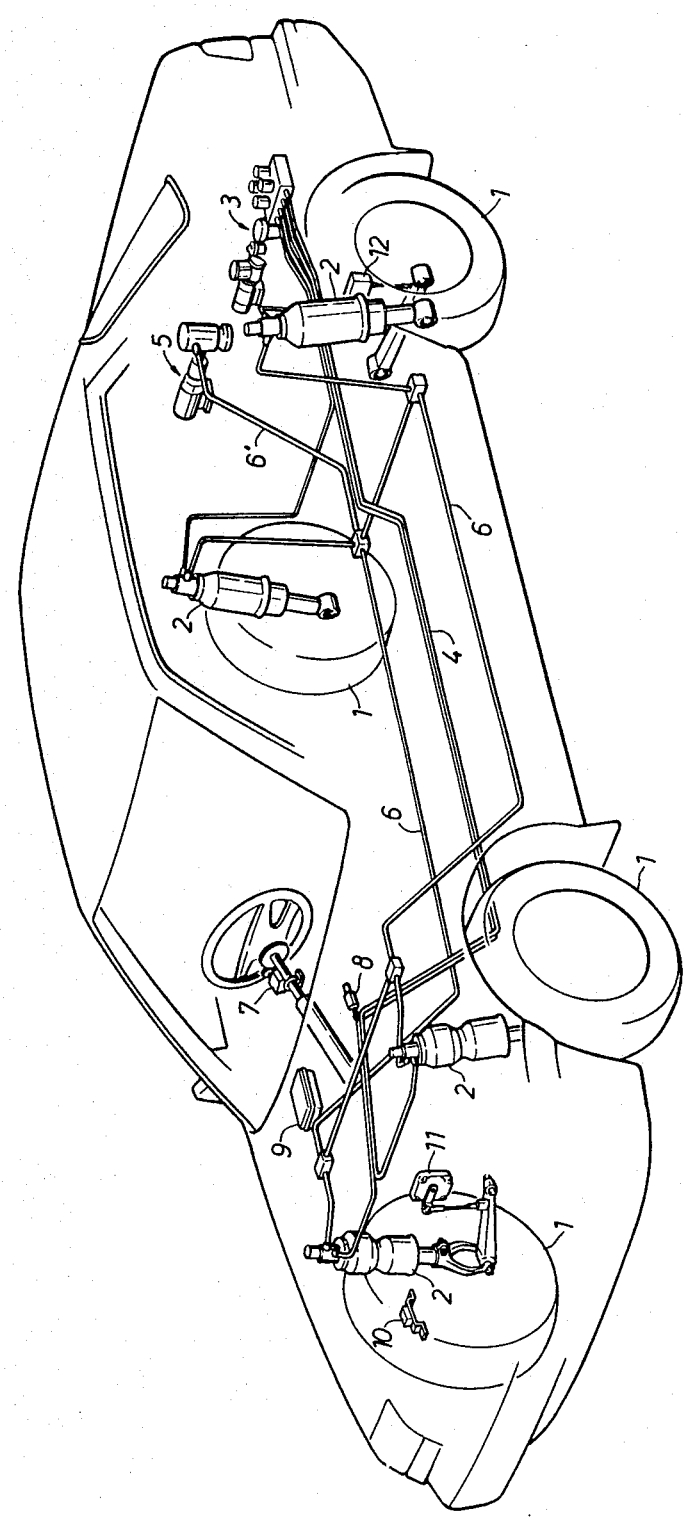
FIG. 1 is an overall perspective view of an mbodiment of the compound suspension system according to the present invention.
Figure 2:
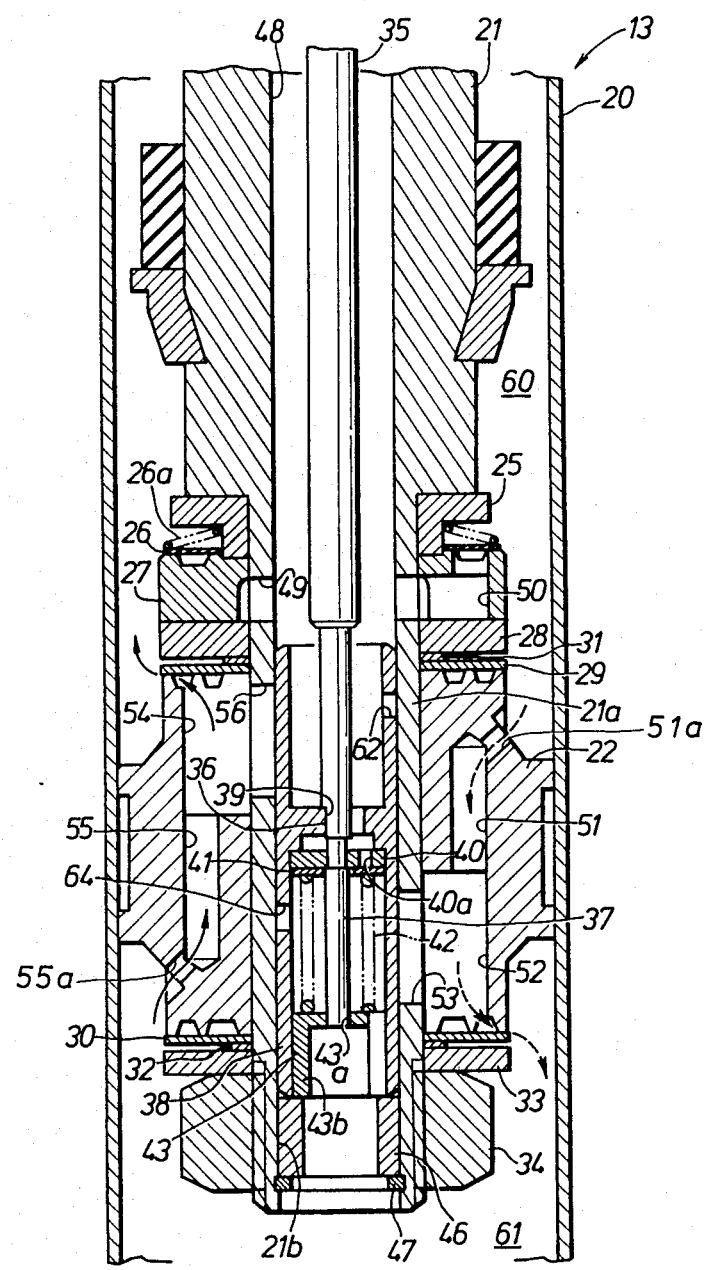
FIGS. 2 to 4 show the details of one of the shock absorbers used in the compound suspension system of FIG. 1 in different stages of its action.

FIG. 1 schematically illustrates a passenger automobile equipped with an embodiment of the compound suspension system according to the present invention. Each of the wheels 1 is supported by an air suspension device 2 combining an air spring and an oil shock absorber 13 (FIG. 2). The air chamber of each of the air suspension devices 2 individually receives a supply of compressed air from an air supply unit 3 by way of an individual air conduit 4. On the other hand, the oil chambers of the oil shock absorbers of the suspension device 2 are interconnected by a common conduit system 6 which is additionally connected to a supply conduit 6' leading to an oil supply unit 5 for supplying working fluid to the overall suspension system. The automobile is further equipped with a steering angle sensor 7, a brake switch 8, a vehicle speed sensor 9, a vertical G sensor 10 and vehicle height sensors 11 and 12. The overall compound suspension system is controlled by an electronic control unit not shown in the drawings according to signals received from these switches and sensors.

FIG. 2 shows a part of the oil shock absorber 13 of one of the air suspension devices 2 shown in FIG. 1 when the intercommunication between the oil shock absorbers have been disconnected and the oil shock absorber is adjusted to its hardest state. This shock absorber 13 may be either a single-tube type or a twin-tube shock absorber and a piston member 22 connected to a piston rod 21 is received in the interior of a cylinder member 20.

The forward end 21a of the piston rod 21 is reduced in diameter, and an annular member 25 having an L-shaped cross section, an annular one-way valve 26 which is urged by a compression coil spring 26a into a closed state, a valve seat member 27 which cooperates with the one-way valve 26, an annular disc member 28, a spacer 31, an annular reed valve 29, the piston member 22, a second reed valve 30, a spacer 32 and a second annular disc 33 are fitted over the forward end 21a of the piston rod 21 with a reduced diameter, in that order. These members are held in position by a nut 34 which is threaded over the fore most end of the forward end 21a of the piston rod 21.

A central bore 21b is provided in the center of the piston rod 21 and its upper end in FIG. 2 is communicated with the conduit system 6 by way of an longitudinal passage 48 extending through the piston rod 21 while the lower end of the central bore 21b receives a cylindrical valve element 38 therein. A flat surface 36 of a rod member 35 extending centrally in and along the central bore 21b engages with an longitudinal hole 39 provided in the valve body 38 so that the valve element 38 is made to rotate about its longitudinal central line inside the bore 21b as it is turned by a motor not shown in the drawing by way of the rod member 35.

A disc member 40 having a through hole 40a is fitted over a portion of the rod member 35 slightly below the flat surface 36 and is in turn securely fitted inside the valve element 38, and a reed valve 41 is urged upward against the lower surface of this disc member 40 by a compression coil spring 42. The other end of the compression coil spring 42 is engaged to a retaining member 43 which is fixedly secured in the bore 21b by means of a collar 46 which abuts the lower ends of the retaining member 43b and the valve element 38, and a snap ring 47 fitted into an annular groove provided in the inner circumferential surface of the piston rod 21 prevents the collar 46 from coming off externally from the fore most end of the bore 21b. The retaining member 43 is provided with a central hole 43a which receives the lower end 37 of the rod member 35 with a reduced diameter in a freely rotatable manner and four longitudinal legs 43b which extend away from the compression coil spring 42. This retaining member 43 freely permits longitudinal fluid flow from one side of the retaining member 43 to the other.

The forward end 21b of the piston rod 21 adjacent to the valve seat member 27 is provided with openings 49 for defining a passage communicating the passage 48 to a passage 50 defined in the valve seat member 27. Opening 49 and passage 48 comprise a common conduit. Thus, the passage 48 is communicated with a back oil chamber 60 defined to the back of the piston member 22 by way of the one-way valve 26 which permits fluid flow from the passage 48 to the back oil chamber 60 and forbids fluid flow in the opposite direction.

Further, the piston member 22 is provided with two sets of longitudinal passages 51 and 52, and 54 and 55 which communicate the back oil chamber 60 with a front oil chamber 61 defined in front of the piston member 22 by way of reed valves 29 and 30, respectively. Specifically, the passage 52 is communicated with the front chamber 61 by way of the reed valve 30 which permits fluid flow from the passage 52 to the front chamber 61 while the passage 51 communicates the passage 52 to the back chamber 60 by way of a port 51a at all time. The passage 54 is communicated with the back chamber 60 by way of the reed valve 29 which permits fluid flow from the passage 54 to the back chamber 60 while the passage 55 communicates the passage 54 with the front chamber 61 by way of a port 55a at all time.

Figure 3:
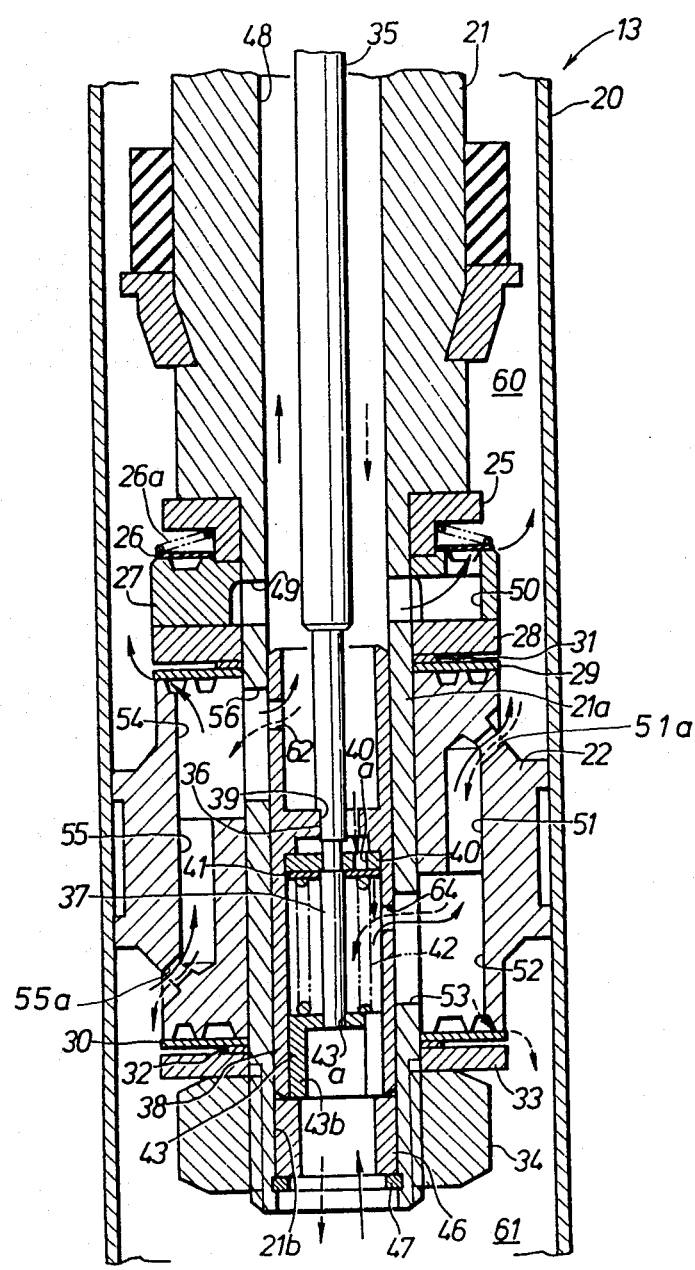
Figure 4:
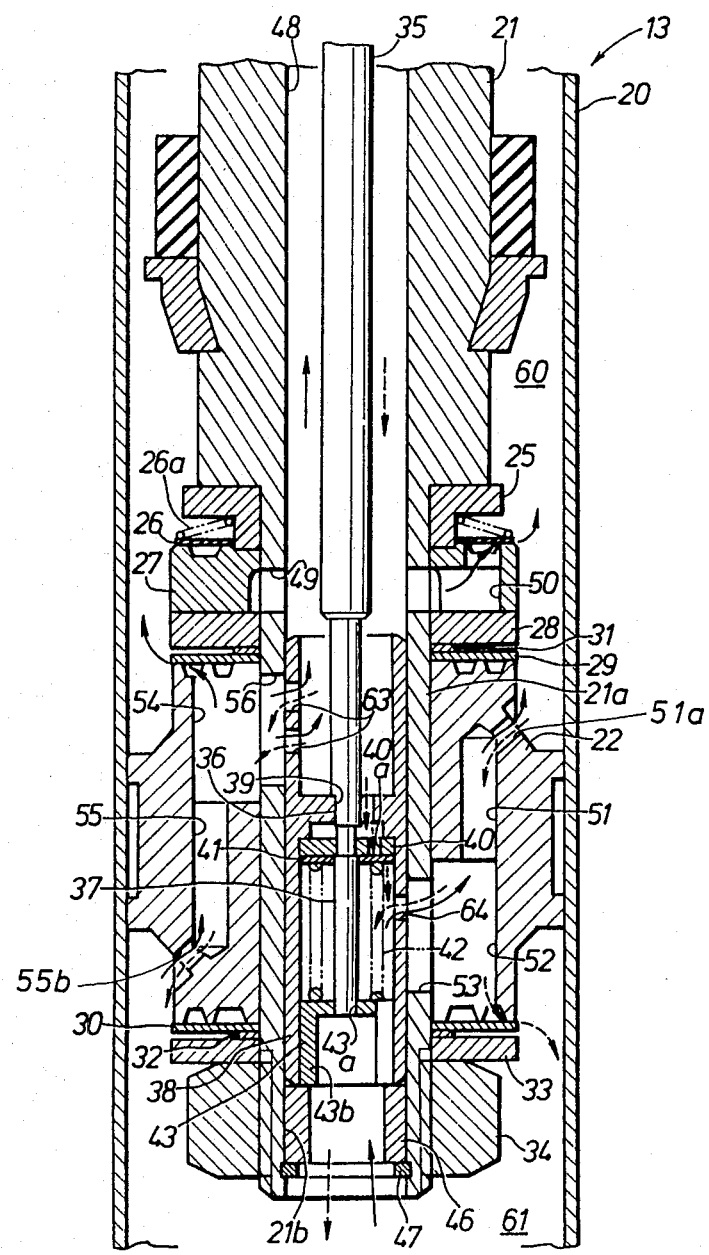

Thus, as shown by the solid arrows and the dotted arrows in FIG. 2, the reed valves 29 and 30 permit fluid flow from the front chamber 61 to the back chamber 60 and from the back chamber 60 to the front chamber 61, respectively. In FIGS. 2 to 4, the solid arrows indicate the fluid flow during compression while the dotted arrows indicate the fluid flow during extension.

The passage 54 faces a port 56 provided in the forward end 21a of the piston rod 21 thus exposing the corresponding outer surface of the valve element 38 to the passage 54. This portion of the valve element 38 is provided with an opening 62 and a pair of vertically spaced holes 63 in a circumferentially mutually spaced relationship as shown in FIGS. 3 respectively and 4. Therefore, when the valve element 38 is position as indicated in FIG. 2, the passage 54 is shut off from the passage 48, but, when the valve element 38 is turned as shown in FIGS. 3 and 4, the passage 54 is communicated with the passage 48 in different degrees of communication. The passage 52 likewise faces a port 53 provided in the forward end 21a of the piston rod 21 adjacent to the passage 52 thus exposing the corresponding outer surface of the valve element 38 to the passage 52. An opening 64 is provided at a certain circumferential location of the valve element 38 and when this opening 64 aligns with the port 53 the passage 52 communicates with the front chamber 61 by way of the port 53 and the opening 64.

Figure 5:
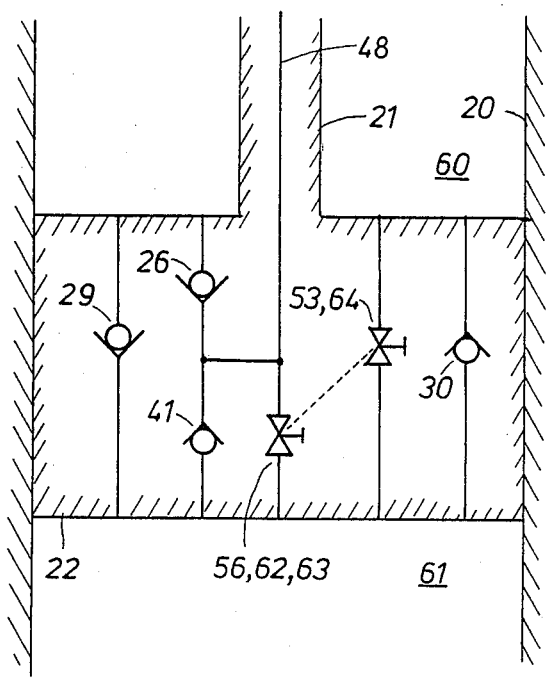
FIG. 5 shows a circuit diagram of the oil passages provided in the piston means of each shock absorber.

FIG. 5 shows the arrangement of the one-way valves and the passages in the piston member 22 and other members adjacent thereto in a simplified manner. As can be seen from this diagram, the one-way valves or the reed valves 29 and 30 permit the fluid flow between the front chamber 61 and the back chamber 60 in different direction. The passages for these flows in different directions may present different degrees of resistance as required for optimum design of a shock absorber. The valve provided by the port 53 and the opening 64 adjust the flow of fluid across the piston element 22 or between the front chamber 60 and the back chamber 61. The longitudinal passage 48 leading to the common conduit system 6 is connected to the front chamber 61 and the back chamber 60 by way of the one-way valves 41 and 26, respectively, which permit the flow of fluid in the direction to "fill" the corresponding chambers 61 and 60. The valve formed by the port 56 and the openings 62 and 63 can adjust the degree of communication between the front chamber 61 and the longitudinal passage 48.

Now the action of the present embodiment is described in the following with reference to FIGS. 2 to 5.

When the valve element 38 is at the position shown in FIG. 2, the passage 54 or the port 56 is not communicated with the opening 62 or the openings 63, and the opening 64 of the valve element 38 is not aligned with the port 53 of the forward end 21b of the piston rod 21. Therefore, the passage 48 is completely disconnected from the front chamber 61 and the back chamber 60 except for the fluid communication due to the one-way valve 26 and the reed valve 41 which permit the flow of fluid in the direction to fill the back chamber 60 and the front chamber 61, respectively, and there is substantial no communication between the oil chambers of different oil shock absorbers. When the shock absorber is compressed, the oil in the front chamber 61 pushes open the reed valve 29 and can flow into the back chamber 60. In this state, the reed valves 30 and 41 are both closed. When the shock absorber is extended, the reed valve 29 is closed but the oil in the back chamber 60 pushes open the reed valve 30 and can flow into the front chamber 61 by way of the passages 51 and 52. In this case, the reed valve 26 is closed. In either case, if oil is forced into the shock absorber from the longitudinal passage 48, it could fill the back chamber 60 or the front chamber 61 by way of the one-way valve 26 or the reed valve 41 as the case may be.

Thus, in the state shown in FIG. 2, in effect, the longitudinal passage 48 is connected to neither one of the oil chambers 60 and 61 and the flow of the oil takes place only through the reed valves 29 and 30. Therefore, the communication between the oil shock absorbers are disconnected and the oil shock absorbers give a "hard" ride.

When the rod member 35 is turned until the opening 64 aligns with the port 53 and the opening 62 aligns with 56, as shown in FIG. 3 a passage is formed between the two oil chambers 60 and 61 by way of the opening 64, the port 53 and the passages 51 and 52. This passage is effective for both compression and extension without having a one-way valve therein. Additionally, during compression, the fluid can flow from the oil chamber 61 to the oil chamber 60 by way of the passages 55 and 54, the port 56 and the opening 62 and the one-way valve 26.

As for the communication between the oil chambers of different shock absorbers, the oil chamber 61 is communicated with the longitudinal passage 48 by way of the passages 55 and 54, the port 56 and the opening 62 irrespective of the direction of the fluid flow. During extension, a communication is established from the longitudinal passage 48 to the oil chamber 61 by way of the reed valve 41 as required.

Thus, the resistance to the fluid flow between the two chambers 60 and 61 is reduced or, in other words, the damping coefficient of the shock absorber is reduced, and the front chambers 61 of different shock absorbers are intercommunicated.

When the rod member 35 is turned further, while the communication through the port 53 and the opening 64 is maintained, the openings 63, instead of the opening 62, align with the port 56 as shown in FIG. 4. Thus, the degree of communication between the passage 54 and the longitudinal passage 48 is increased as compared to the state shown in FIG. 3. Also, the degree of communication between the two oil chambers 60 and 61 by way of the passages 55 and 54, the port 56, the opening 63 and the one-way valve 26 is increased as compared to the state shown in FIG. 3. Thus, not only the communication between the oil chambers of different shock absorber is enhanced but also the damping coefficient of the individual shock absorbers is reduced. Thus, the damping coefficient of the shock absorber is even further reduced, and the front chambers 61 of different shock absorbers are communicated with each other to an even greater degree.

The above-described embodiment is given only as an example and is in no way intended to limit the scope of the invention. For instance, it is all within the scope and the spirit of the present invention to variously modify the sizes and the arrangement of the openings 62 to 64 provided in the valve element 38 for obtaining the desired damping coefficients of the shock absorbers and the optimum degree of communication between the oil chambers of different shock absorbers according to the different angular positioning of the valve body 38.

Thus, according to the present invention, since the damping coefficient of each oil shock absorber and the degree of communication between the oil chambers of different oil shock abng coefficient of each oil shock absorber and the degree of communication between the oil chambers of different oil shock absorbers can be adjusted with a common valve element, the work involve in the manufacturing and assembling of a compound suspension system is reduced and the structure of the device for controlling the action of the suspension system can be simplified.

What we claim is:

1. A compound suspension system comprising a plurality of hydraulic shock absorbers each having a front chamber and a back chamber defined in front of and behind, a piston means, respectively, received in a cylinder member, and a valve means provided in each of the shock absorbers for selectively communicating the chambers to a conduit which is common to at least one other shock absorber, wherein:

the valve means is provided with a first part for varying a degree of communication between the front chamber and the common conduit and a second part for varying a degree of communication between the front chamber and the back chamber.

2. A compound suspension system as defined in claim 1, wherein the first part and the second part of the valve means comprise a common valve element which is adapted to be actuated by a common actuating means.

3. A compound suspension system as defined in claim 1, wherein the piston means is provided with a pair of damping passages communicating the front chamber and the back chamber with each other, each of the damping passages being provided with a one-way valve permitting fluid flow of a different direction from the one-way valve provided in the other damping passage.

4. A compound suspension system comprising a plurality of hydraulic shock absorbers each having a front chamber and a back chamber and a piston means for separating said front chamber and said back chamber, respectively, received in a cylinder member, said piston means comprising a valve means provided in each of the shock absorbers for selectively communicating the chambers to a conduit which is common to at least one other shock absorber, wherein:

the valve means is provided with a first part for varying a degree of communication between the front chamber and the common conduit and a second part for varying a degree of communication between the front chamber and the back chamber, said piston means is provided with a pair of damping passages communicating the front chamber and the back chamber with each other, each of the damping passages being provided with a one-way valve permitting fluid flow of a different direction from the one-way valve provided in the other damping passage, wherein the piston means is further provided with a pair of compound passages which communicate the common conduit to the front chamber and the back chamber, respectively, each of the compound passages being provided with a one-way valve which permits fluid flow directed from the common conduit to the corresponding chamber.

5. A compound suspension system as defined in claim 4, wherein said valve means first and second parts comprise a cylindrical and substantially hollow valve element which is received in a free end of a hollow piston rod connected to the piston means, in a rotatable manner about its longitudinal center line, the valve element being provided with openings which cooperate with ports provided in the free end of the hollow piston rod.

6. A compound suspension system as defined in claim 5, wherein the valve element is provided with two sets of openings, the two sets of openings being spaced from each other along a longitudinal direction of the valve element, each of the sets of openings presenting different opening areas to the corresponding port depending on angular position of the valve element relative to the piston rod.

7. A compound suspension system as defined in claim 6, wherein the valve element defines a longitudinal passage which forms at least a part of the compound passages communicating the common conduit with the front chamber, the longitudinal passage being provided with the one-way valve which permits fluid flow from the common conduit to the front chamber.

8. A compound suspension system as defined in claim 7, wherein the piston means is provided with a piston member which defines two longitudinal passages which form at least a part of the damping passages communicating the front chamber and the back chamber with each other, the one-way valves being provided at respective outlet ends of the longitudinal passages, the longitudinal passage which is directly communicated with the front chamber being directly communicated with one of said ports which cooperates with the opening of the valve element for communication between the front chamber and the common conduit while the longitudinal passage which is directly communicated with the back chamber is directly communicated with another of said ports which cooperates with the opening of the valve element for communication between the front chamber and the back chamber.

9. A compound suspension system as defined in claim 5, wherein the valve element is provided with an engagement surface in a middle part thereof for engagement with a control rod which extends longitudinally in a central bore of the hollow piston rod, a free end of the control rod being received in a hole provided in a fore most end portion of the control rod.

* * * * *